R. GANS.
SOFTENING OF WATER.
APPLICATION FILED AUG. 5, 1911. RENEWED MAR. 26, 1915.
1,195,923.
Patented Aug. 22, 1916.
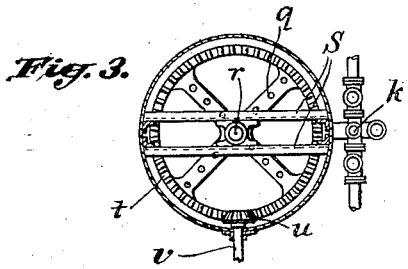
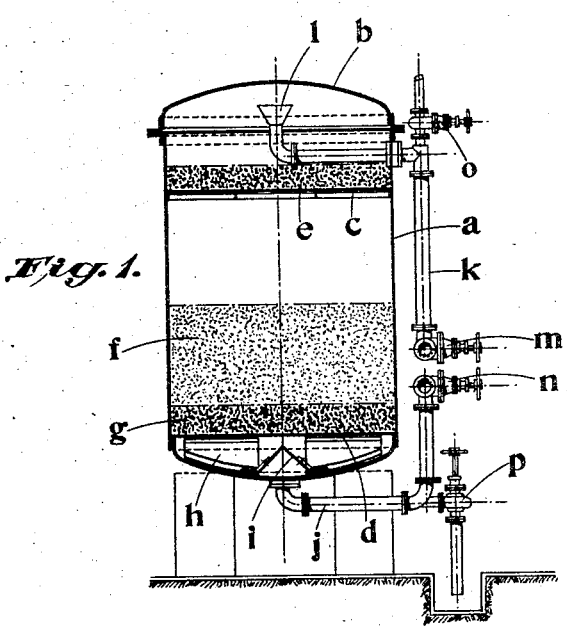
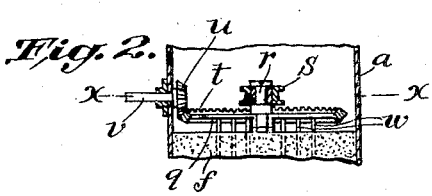
Witnesses—
Inventor
Robert Gans
by
Attorney.

UNITED STATES PATENT OFFICE.

ROBERT GANS, OF BERLIN, GERMANY, ASSIGNOR TO J. D. RIEDEL AKTIENGESELL-SCHAFT, OF BERLIN, GERMANY.

SOFTENING OF WATER.

1,195,923. Specification of Letters Patent. Patented Aug. 22, 1916.

Application filed August 5, 1911, Serial No. 642,477. Renewed March 26, 1915. Serial No. 17,244.

*To all whom it may concern:*

Be it known that I, Dr. ROBERT GANS, a subject of the German Emperor, residing at Berlin, Germany, (whose post-office address is Pankow, near Berlin, Germany,) have invented certain new and useful Improvements Relating to the Softening of Water, of which the following is a specification.

This invention relates to an apparatus for softening water in the use of zeolites or hydrated alumino-silicates.

It is known that zeolites or hydrated alumino-silicates have the property of softening hard water and the present invention has for its object an apparatus in which the zeolites or alumino-silicates can be used in a filter and be regenerated therein so as to be capable of continuous use for the softening of water.

The zeolites or hydrated alumino-silicates that occur in nature are ill adapted, without special treatment for the purpose, inasmuch as their capacity for the exchange of their base, upon which their property of softening hard water depends, is relatively small, while they have little or no capacity for regeneration or reconversion to their original condition, whereby they can be continuously used.

Furthermore zeolites or hydrated alumino-silicates for use in softening hard water by mere filtration of the hard water through them must not only possess a high capacity for exchange of their base and a high capacity for regeneration or re-conversion to their original condition, but they must be hard and large grained, and adapted by their physical qualities for use as filtering media, for example, those produced according to the process described in my application Serial No. 642383 filed 4th August 1911.

The accompanying drawing illustrates diagrammatically and by way of example a filter provided according to the invention.

In this showing, Figure 1 is a view in central vertical section of an apparatus under the present invention; Fig. 2 is a similar but fragmental view of a modification carrying a stirring device; and Fig. 3 is a horizontal section of the same along line $x$—$x$ of Fig. 2.

In carrying the invention into effect as illustrated in the accompanying drawing a vertical cylindrical casing $a$ is provided having a coned bottom and closed at the top by a cover plate $b$ and within this casing a number of horizontally disposed perforated plates such as $c$ and $d$ are suitably mounted. The perforated plate $c$ carries a layer or layers of quartz or sand through which the water to be softened may be first filtered, while the perforated plate $d$ carries a layer of hard coarse grained zeolites $f$ through which the water then passes, the layer of zeolites advantageously having a layer $g$ beneath of quartz or sand. The water to be softened passes from the supply pipe $k$ through the inlet valve $m$ and inlet pipe $l$ to the filter, passing down the filter layer $e$, thence through the layer of zeolites or alumino-silicates $f$ and the layer of sand or quartz $g$, to the water collecting chamber $h$, whence it passes through the conical perforated screen $i$, through the outlet pipe $j$ and valve $n$; $j$ being located at and drawing from the lowest point of the bottom.

In operation the inlet valve $m$ for the water to be softened, as well as the outlet valve $n$ are opened and the water then caused to pass through the filter, and to be completely softened thereby.

After the softening property of the zeolites has been exhausted or reduced, which can be readily ascertained by testing the water passed through, the inlet valve $m$ and outlet valve $n$ are closed, and a solution of a sodium salt such as common salt, is passed through the filter by opening the inlet valve $o$ in a pipe leading to a suitable source of supply (not shown) of such salt solution and allowing the solution of salt after passing through the filter to pass outwardly through outlet $j$ at the low point of the bottom and thence escape through the waste valve $p$. By such means it will be understood that the passage of water through the filter may be cut off or diverted, and the regenerating solution may then be passed through so that the zeolites may be regenerated, and thus the filter is capable of continuous use without the removal of the zeolites from the filter or their renewal.

It is obvious that as a matter of practical convenience two such filters may be provided, so that one may be used, while the zeolites are regenerated in the other, and thus an uninterrupted supply of soft water provided.

As shown in Figs. 2 and 3, means may be provided for stirring the zeolites, as for example in washing, ("back washing") to remove impurities mechanically taken up by the zeolites. Such means may conveniently consist of plate $q$ mounted on shaft $r$ supported by cross beams $s$ in casing $a$. This plate is capable of rotating by means of a series of bevel teeth $t$ carried by the plate gearing with pinion $u$ operable from outside the casing by means of shaft $v$. The plate may advantageously have secured to it a series of rods $w$ passing into the zeolites so that on rotation of the plate the zeolites are stirred. In back washing the silicates by passing a current of water therethrough in the reverse direction from suitable connections in the usual manner for the purpose of removing slime, mechanically collected matters, etc. this stirring is advantageous.

The respective layers of filtering material and zeolites may be contained within perforated or other similar removable casings, let into the filter casing $a$, so that the removal of the filtering material and zeolites from the filter casing may be facilitated when such is at any time required.

What I claim as my invention and desire to secure by Letters Patent is:—

1. A water softening apparatus comprising a casing, a filter bed consisting of a layer of sand or quartz and a layer of zeolites or hydrated alumino-silicates disposed on the layer of sand or quartz, means for permitting the passage of water through the casing, means for cutting off the supply of water on the exhaustion of the zeolites, and means for passing through the casing a solution of a salt capable of regenerating the zeolites.

2. A water softening apparatus comprising a casing, a filter bed within said casing, said filter bed consisting of a layer of sand or quartz and a layer of zeolites or hydrated alumino-silicates disposed on the layer of sand or quartz, means for permitting the passage of water through the casing, means for cutting off the supply of water on the exhaustion of the zeolites and means for passing through the casing a solution of a salt capable of regenerating the zeolites and means for stirring the layer of zeolites.

3. A water softening apparatus comprising a casing, perforated plates disposed one above the other within said casing, layers of quartz or sand on said plates, a layer of zeolites or hydrated alumino-silicates disposed on the lower layer of sand, means for permitting the passage of water through the filter plate, means for cutting off the supply of water on the exhaustion of the zeolites and means for passing through the casing a solution of a salt capable of regenerating the zeolites.

4. A water softening apparatus comprising a casing, perforated plates disposed one above the other within said casing, layers of quartz or sand on said plates, a layer of zeolites or hydrated alumino-silicates disposed on the lower layer of sand, means for permitting the passage of water through the filter plate, means for cutting off the supply of water on the exhaustion of the zeolites and means for passing through the casing a solution of a salt capable of regenerating the zeolites, and means for stirring the zeolites.

5. Water softening apparatus comprising a casing, a filter bed consisting of a layer of zeolites or alumino-silicates, supporting means for said layer, means for permitting the passage of water through the casing, means for cutting off the supply of water on the exhaustion of the zeolites, means for supplying and passing into the casing a solution of a salt capable of regenerating zeolites and means connected to the lowest point of the casing for removing the salt solution so introduced.

6. Water softening apparatus comprising a casing, a filter bed consisting of a layer of water softening material of zeolitic nature, supporting means for said layer, a supply pipe leading to one end of the casing for supplying hard water, another pipe communicating with the same end, a pipe leading from the other end of said casing for delivering softened water and another pipe also connected to the same end, the pipe connected to the lowest end of the casing being adapted for complete drainage of said casing and the other pipe connected with the same end leading to a place of disposal of waste salt solution and the other pipe communicating with the said other end being connected to a suitable source of revivifying salt solution.

In testimony whereof I have hereunto signed my name to this specification in the presence of two subscribing witnesses.

Dr. ROBERT GANS.

Witnesses:
Dr. CORNELIUS MASSACIN,
AUGUST HERRMANN.

DISCLAIMER.

1,195,923.—*Robert Gans*, Berlin, Germany. SOFTENING OF WATER. Patent dated August 22, 1916. Disclaimer filed March 2, 1920, by the assignee, by mesne assignments, *The Permutit Company*.

"Hereby disclaims from the scope of claim 1 of Patent 1,195,923, any water softening apparatus including a layer of zeolites or hydrated alumino-silicates disposed on a layer of sand or quartz in which the water to be softened is so introduced into the casing that it passes upwardly through said layer of zeolites."

[*Official Gazette March 16, 1920.*]